United States Patent
Long (10) Patent No.: US 12,325,300 B2
(45) Date of Patent: Jun. 10, 2025

(54) END DRIVE UNIT AND WORK VEHICLE WITH SAME

(71) Applicant: Deere & Company, Moline, IL (US)

(72) Inventor: Randall L. Long, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 18/456,008

(22) Filed: Aug. 25, 2023

(65) Prior Publication Data

US 2025/0065713 A1  Feb. 27, 2025

(51) Int. Cl.
*B60K 17/04* (2006.01)
*B60K 7/00* (2006.01)
*F16H 57/031* (2012.01)

(52) U.S. Cl.
CPC .... *B60K 17/046* (2013.01); *B60K 2007/0092* (2013.01); *F16H 57/031* (2013.01)

(58) Field of Classification Search
CPC . B60K 17/043–046; B60K 2007/0092; B62M 11/14–18; B60B 35/122–125; F16H 57/031
See application file for complete search history.

(56) References Cited

U.S. PATENT DOCUMENTS

| | | |
|---|---|---|
| 4,010,830 A | 3/1977 | Logus et al. |
| 6,582,339 B2* | 6/2003 | Damm ................ B60K 17/046 |
| | | 180/372 |
| 9,511,661 B2* | 12/2016 | Brownell ............ F16H 61/0265 |
| 9,618,084 B2* | 4/2017 | Wagh ..................... B62D 55/12 |
| 9,950,562 B2* | 4/2018 | Forrest ................ B60K 17/046 |
| 10,099,552 B2 | 10/2018 | Long et al. |
| 10,107,363 B2 | 10/2018 | Fliearman et al. |
| 10,207,580 B2 | 2/2019 | Long et al. |

(Continued)

FOREIGN PATENT DOCUMENTS

| | | |
|---|---|---|
| CN | 104590001 A | 5/2015 |
| CN | 109398069 A | 3/2019 |

(Continued)

OTHER PUBLICATIONS

German Search Report issued in application No. 102024120670.5 dated Apr. 4, 2025, 08 pages.

*Primary Examiner* — James J Taylor, II
(74) *Attorney, Agent, or Firm* — KLINTWORTH & ROZENBLAT IP LLP (57) ABSTRACT

An end drive unit for a work vehicle having a ground-engaging member includes a drive casing configured to mount to the work vehicle. An input shaft is disposed within the drive casing and configured to receive rotational power to drive a planetary set driven having a grounded carrier fixed with respect to the drive casing. A drive hub is mountable to the ground-engaging member of the work vehicle and supported for rotation about a drive axis by the planetary set and a bearing mounted to the grounded carrier. A drive brake arrangement is configured to impede rotation of the planetary set and thereby rotation of the drive hub about the drive axis. A service panel is coupled to the drive casing such that removal of the service panel facilitates access to the drive brake arrangement for service or deactivation of the drive brake arrangement without disassembly of the planetary set.

20 Claims, 6 Drawing Sheets

(56) References Cited

U.S. PATENT DOCUMENTS

| | | | |
|---|---|---|---|
| 10,214,101 B2 | 2/2019 | Fliearman et al. | |
| 11,624,170 B2 * | 4/2023 | Dhanal | F16D 11/14 |
| | | | 192/53.361 |
| 2023/0227009 A1 * | 7/2023 | Siepker | F16H 3/62 |
| | | | 192/215 |

FOREIGN PATENT DOCUMENTS

| | | |
|---|---|---|
| DE | 202022100214 U1 | 4/2023 |
| GB | 1483731 | 8/1977 |
| WO | 2010041824 A2 | 4/2010 |

* cited by examiner

END DRIVE UNIT AND WORK VEHICLE WITH SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to drive systems for work vehicles, and more specifically to gear reduction end drive units.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. End drive units, sometimes referred to as final drives or wheel end drives, may be utilized to provide deep-ratio gear reduction to facilitate high torque at the ground-engaging wheels or tracks. Such end drive units may employ planetary gear sets to provide the gear reduction within a compact package.

SUMMARY OF THE DISCLOSURE

The disclosure provides an improved end drive unit for a work vehicle and a work vehicle utilizing such an end drive unit.

In particular, the disclosure provides an end drive unit for a work vehicle having a ground-engaging member. The end drive unit includes a drive casing configured to mount to the work vehicle. An input shaft is disposed within the drive casing and configured to receive rotational power. A planetary set driven by the input shaft has a grounded carrier fixed with respect to the drive casing. A drive hub mountable to the ground-engaging member of the work vehicle is supported for rotation about a drive axis by the planetary set and a bearing mounted to the grounded carrier. A drive brake arrangement is configured to impede rotation of the planetary set and thereby rotation of the drive hub about the drive axis. A service panel is coupled to the drive casing such that removal of the service panel facilitates access to the drive brake arrangement for service or deactivation of the drive brake arrangement without disassembly of the planetary set.

In this and other embodiments, the planetary set is a dual planetary set with a first stage planetary set and a second stage planetary set. Power is transmitted in to a first sun gear and out through a first carrier of the first stage planetary set and in to a second sun gear and out through a second ring gear of the second stage planetary set. The first sun gear is driven by the input shaft and the second ring gear drives the drive hub. In this case, the grounded carrier is a second carrier of the second stage planetary set. The second carrier may have an elongated annular section on which is supported a dual bearing arrangement that facilitates rotation of the drive hub about the drive axis. The elongated annular section of the second carrier and the dual bearing arrangement are outboard of the second ring gear of the second stage planetary set. The second carrier and a first ring gear of the first stage planetary set are bolted to the drive casing.

In these and other embodiments, the input shaft defines or supports for corotation the first sun gear of the first stage planetary set and supports a second sun gear of the second stage planetary set for relative rotation therewith. The input shaft supports the drive brake arrangement at an outboard end opposite from an input at an inboard end. The input shaft supports the drive brake arrangement outboard of the first stage planetary set and the second stage planetary set. The drive brake arrangement may be disposed about the drive axis concentric with the elongated annular section of the second carrier and the dual bearing arrangement.

In these and other embodiments, the drive brake arrangement includes an actuator and a disc pack. The actuator is selectively operated to engage and release the disc pack. When engaged, the drive brake arrangement ties the input shaft to the second carrier which is grounded to the drive casing. The disc pack is coupled to the input shaft by an adapter and retained in the second carrier by a retainer plate. When the service panel is removed, the retainer plate is accessible. When the retainer plate is removed, the drive brake arrangement is serviceable.

In these and still other embodiments, the service panel is mounted directly to an outboard face of the drive hub.

Another aspect of the disclosure provides a work vehicle having a chassis, a ground-engaging member supporting the chassis off the ground and facilitating tractive motion of the work vehicle by rotation about a drive axis, a power drive unit, and an end drive unit driven by the power drive unit. The end drive unit include a drive casing configured to couple to the chassis. An input shaft is disposed within the drive casing and receives rotational power from the power drive unit. A planetary set driven by the input shaft has a grounded carrier fixed with respect to the drive casing. A drive hub is mounted to the ground-engaging member and supported for rotation about the drive axis by the planetary set and a bearing mounted to the grounded carrier. A drive brake arrangement is configured to impede rotation of the planetary set and thereby rotation of the drive hub about the drive axis. A service panel is coupled to the drive casing such that removal of the service panel facilitates access to the drive brake arrangement for service or deactivation of the drive brake arrangement without disassembly of the planetary set. Various of the aforementioned embodiments of the end drive unit may be incorporated in the work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed end drive unit, as shown in the accompanying figures of the drawings described briefly above. Various modifications to the example embodiments may be contemplated by one of skill in the art. Discussion herein focuses on the example application associated with an agricultural vehicle as a self-propelled windrower, but the disclosed embodiments may be applicable to other types of work vehicles in agriculture as well as in industries other than agricultural, such as construction, forestry, mining, etc.

End drive units are known for providing a deep gear reduction ratio for delivering high-torque power for traction and other purposes in work vehicles. Final drives and wheel end drives are mounted at or near the end of the driveline just prior to, and often mounting to the work vehicle chassis, the ground-engaging wheels or tracks. Typically such final drives mount within the hub of a wheel or track to rotatably couple the wheel or track to the chassis of the work vehicle.

Certain work vehicle platforms have a desired wheel or track base (i.e., the distance between left and right wheels or tracks). For example, an agricultural sprayer may have a wheelbase selected to be a multiple of a common spacing distance between crop rows, such that both sets of wheels or tracks may ride on the ground forming the spacing between crop rows so as to not damage live crop during spraying applications. Ensuring a given wheel or track base requires various components (e.g., axles, transaxles, final drives, and so on) to be packaged and sized to fit the desired dimension.

Another design consideration for such end drive units is maintenance and serviceability. The end drive units may be complex assemblies with various gear reduction components that may require lubrication, cooling, and hydraulic pressure. The end drive units may also include various wear components, such as clutches and brakes, that operate by friction and thus wear over time. Service access to such wear components amongst the complex gear assemblies may be difficult and require the gear assemblies to be wholly or in part disassembled to reach the components being serviced followed by their reassembly after servicing.

Disclosed herein is an end drive unit that addresses these and other issues. In one aspect, the end drive unit provides a hub mounting plane that is located closer to an outboard end of the end drive unit than the inboard end. The hub mounting plane may be defined by a mounting flange to which the wheel or track hub is bolted. In various embodiments, the end drive unit has a drive hub that rotates on one or more primary bearings sized and configured to support and withstand the loading of the work vehicle.

In some embodiments, the end drive unit includes planetary gear reduction in one or more stages, such as a double planetary arrangement having a first stage planetary set and a second stage planetary set. The first stage planetary set may be inboard (i.e., closer to the fore-aft centerline of the work vehicle) of the second stage planetary set. The second stage planetary set may include a deep set planet carrier having an annular section that is elongated (wide or long) in the direction of a drive axis about which the carrier is disposed concentrically and about which the primary bearings rotate the drive hub. The mounting flange of the drive hub is positioned within the axial length of the annular section of the carrier. In some cases, the carrier is a grounded carrier fixed against rotation with respect to a drive casing of the end drive unit.

In some embodiments, the annular section of the second stage carrier opens toward the outboard end of the end drive unit and is sufficiently deep to accommodate a brake arrangement, which is operable as a service brake, a park brake, or both. As such, the brake arrangement is outboard (i.e., farther from the fore-aft centerline of the work vehicle) of the planetary arrangement such that the planetary arrangement requires no disassembly for servicing the brake arrangement. A readily reachable service panel provides access to the interior of the end drive unit, and once removed, some or all of the components of the brake arrangement may be accessed, removed, and replaced without disturbing the planetary arrangement. The end drive unit may also have packaging and component configuration aspects that facilitate initial installation and assembly of the primary bearings and drive hub without requiring subsequent assembly steps associated with the planetary gear arrangement.

The end drive unit of this disclosure will be better understood with reference to an example wheel end drive for an agricultural windrower, which will now be described.

EXAMPLE END DRIVE UNIT ARRANGEMENT

Figure 1:
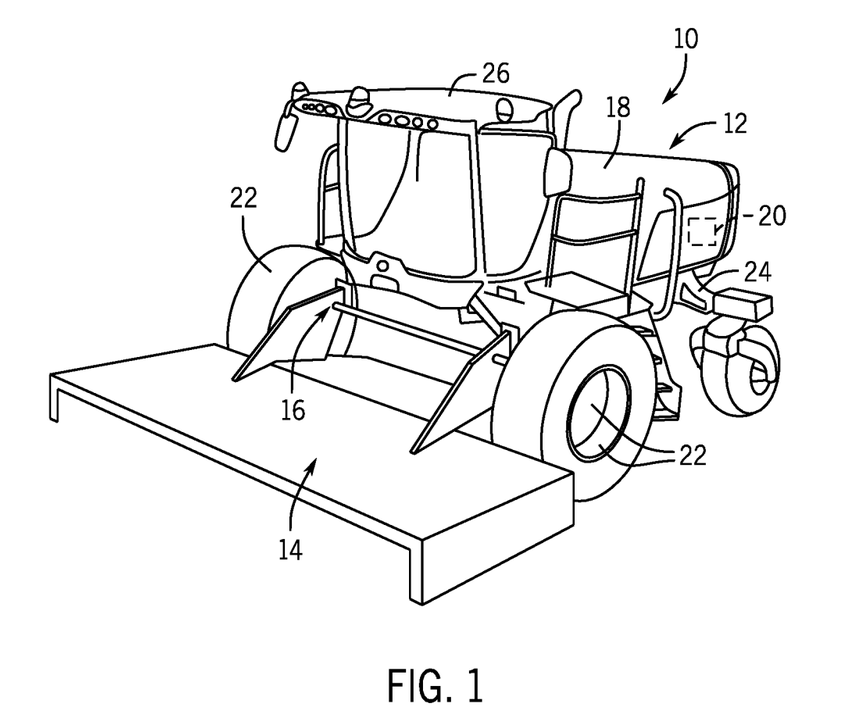
FIG. 1 is a perspective view of an example work vehicle in the form of a self-propelled windrower incorporating the end drive unit of the present disclosure.

Referring now to FIG. 1, an example work vehicle 10 in the form of a self-propelled windrower incorporates an example end drive unit arrangement according to this disclosure. The example work vehicle 10 includes a traction unit 12, a header 14, and a header positioning assembly 16. The traction unit 12 is configured to carry and transport the header 14, which is designed to perform an agricultural operation, and the header positioning assembly 16 moves the header 14 relative to the traction unit 12, for example, between transport and work positions. The traction unit 12 may be any of a wide variety of platforms such as various platforms having an operator cab 26, a main compartment 18, a propulsion source 20 (e.g., internal combustion engine, electric motor, etc.), and one or more ground-engaging members 22 (e.g., wheels, tracks, etc.). In this illustrated example, the header 14 is a rotary mower conditioner of a given width to perform an agricultural operation on a particular type of crop or crops (e.g., harvest or cut a crop). The header positioning assembly 16 couples the header (e.g., the rotary mower conditioner) to a chassis 24 of the traction unit 12, which is supported off the ground by the ground-engaging members 22 and which moves the header 14 relative to the chassis 24 and the ground, and supports the header 14 during operation and transport.

The operator cab 26 may include, for example, one or more operator control input devices (e.g., levers, buttons, touch screen capabilities, or any other type of mechanical or electrical (digital or analog) activation to create and/or send signals to a controller) and one or more output devices (e.g., monitors, displays, speakers, or any other type of audible and/or visual indicator configured to audibly and/or visually convey information to an operator), manipulatable and/or perceivable by the operator to control operation of the work vehicle 10. The operator cab 26, or otherwise the traction unit 12 may also include, for example, one or more controllers having one or more processors configured to execute control commands, code, logic and/or algorithms stored within associated memory or elsewhere. The one or more controllers may be configured to receive, generate, communicate, and transmit signals and control commands from and/or to appropriate components of the work vehicle 10 to effect operation of the traction unit 12, the header 14, and the header positioning assembly 16. For example, an operator or external source may activate an operator control input device which would create a control signal based on the activation of the input device. The control signal would be communicated by the input device to the controller and the controller would act in accordance with the received control signal. For example, the controller may generate one or more control commands and transmit the one or more control commands to one or more output devices for consideration and action by the operator, and/or the controller could transmit one or more control commands to one or more other devices (e.g., adjustment actuators, lift actuators, lift cylinder, headers, motor, engine, etc.) of the work vehicle 10 effecting action of the one or more other devices.

Figure 2:
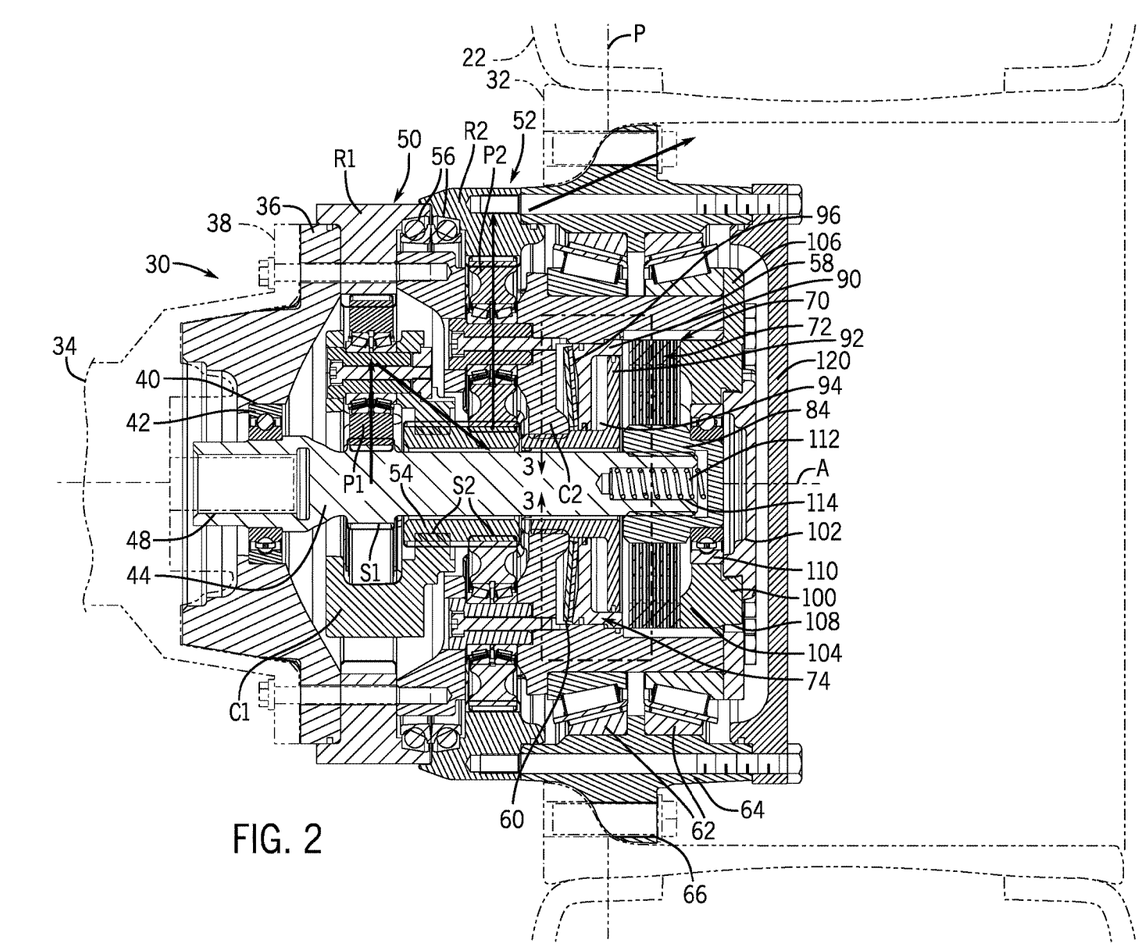
FIG. 2 is a sectional view of an example end drive unit of the present disclosure utilized as a wheel end unit for facilitating tractive power to the work vehicle.

Referring also to FIG. 2, the traction unit 12 may have end drive units 30, such as wheel end or final drives illustrated for purposes of a working example, in the driveline of the traction unit 12 that mount to hubs 32 of the ground-engaging members 22 and provide deep gear reduction ratios to aid in high-torque power transmission. Power is provided to the end drive unit 30 by a drive motor 34 (e.g., a hydraulic or electric motor). In the illustrated example, the end drive unit 30 is configured to allow the hub 32 to be mounted toward an outboard side (i.e., away from a fore-aft centerline of the work vehicle 10) of the end drive unit 30 so that the wheelbase or trackbase of the work vehicle 10 may be widened (i.e., left and right side ground-engaging members may be mounted further apart in a side-to-side or lateral direction perpendicular to the fore-aft centerline of the work vehicle 10) without changing the size or mounting position of other components of the driveline. FIG. 2 shows one end drive unit 30, which is described in detail herein. It will be understood that the work vehicle 10 may include multiple end drive units of the same or similar configuration, including one for each ground-engaging member 22.

In the illustrated example, the end drive unit 30 has a drive casing 36 that is fixed with respect to the chassis 24, for example, by interconnection of a drive motor flange 38 to the chassis 24 and the drive casing 36. The drive casing 36 includes a central opening 40 mounting an inboard shaft bearing 42 supporting an input shaft 44, all of which are disposed about a drive axis A, which is generally perpendicular to the fore-aft centerline of the work vehicle 10. The drive motor 34 has a rotating output shaft 46 disposed in a pocket 48 of the input shaft 44 to rotate the input shaft 44. The drive casing 36 supports a gear arrangement, which in the illustrated example is a double planetary arrangement, including a first planetary set 50 and a second planetary set 52. The double planetary arrangement is configured as a sun-in, carrier out first stage and a sun-in, ring-out second stage.

In particular, the first planetary set 50 includes a sun gear S1, a carrier C1, planet gears P1 (e.g., three in number) mounted for rotation by pinion bearings to pinon shafts of the carrier C1 and engaged with the sun gear S1 and a ring gear R1, which is fixedly fastened to the drive casing 36. The sun gear S1 may be a separate gear fixedly coupled (e.g, via a toothed or splined connection) to the input shaft 44, or, as in the illustrated example, the sun gear S1 may be integrally (monolithically) formed as a toothed section of the input shaft 44. The carrier C1 meshes or fixedly couples (e.g., via a toothed or splined connection) to an inboard end of a hollow shaft 54 disposed concentrically about the input shaft 44 but free to rotate relative to the input shaft 44. An outboard end of the hollow shaft 54 meshes with planet gears P2 (e.g., four in number) of the second planetary set 52, which are mounted for rotation by pinion bearings to pinon shafts of a carrier C2. The hollow shaft 54 thus transmits rotational power from the first planetary set 50 to the second planetary set 52. In the second planetary set 52 a ring gear R2 is carried on ring bearings 56 for rotation relative to the drive casing 36, and the carrier C2 is held fixed to the drive casing 36, and the ring gear R1, via fasteners. Since the ring gear R1 and the carrier C2 are fixed against rotation they may be considered "grounded." Also, in the illustrated example, the sun gear S1 is formed as an integral (i.e., monolithic) part of the input shaft 44, and the sun gear S2 is a formed as an integral (i.e., monolithic) part of the hollow shaft 54, in both cases being teethed sections of the respective components.

The grounded carrier C2 has a large annular section 58, extending about the drive axis A that serves to define a deep brake cavity 60 and a wide outer circumferential surface that supports large main bearings 62 (e.g., two in number). Inner races of the main bearings 62 are fixed (e.g., press-fit) to the carrier C2 and outer races of the main bearings 62 are fixed (e.g., press-fit) to drive hub 64 that fixedly couples to the ring gear R2 via fasteners to rotate relative to the drive casing 36. The drive hub 64 has an outer periphery with a mounting flange 66 for securing the drive hub 64 to the hub 32 of the ground-engaging member 22. In this way, power from the drive motor 34 is transmitted through the double planetary arrangement from the first planetary set 50 (first-stage sun gear S1 in to carrier S1 out) to the second planetary set 52 (second-stage sun gear S2 in to ring R2 out), as shown by the arrows in FIG. 2. The ring gear R2 transmits power to the drive hub 64, which finally transmits power to the hub 32 of the ground-engaging member 22. As can be seen, this arrangement allows the rotational drive plane (e.g., drive plane P) of the drive hub 64 to be well outboard of the upright central plane of the ground-engaging member 22 and the end drive unit 30, and being generally aligned with an upright plane between the two main bearings 62 that is located axially within the span of the annular section of the carrier C2.

Figure 3:
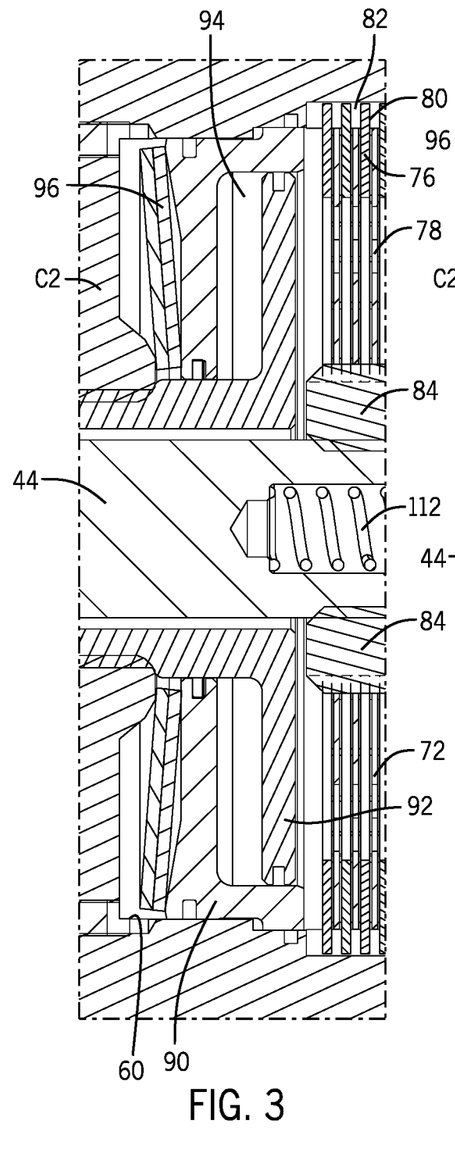
FIG. 3 is an enlarged partial sectional view of area 3-3 in FIG. 2 showing an example brake arrangement of the example end drive unit in a disengaged state.
Figure 4:
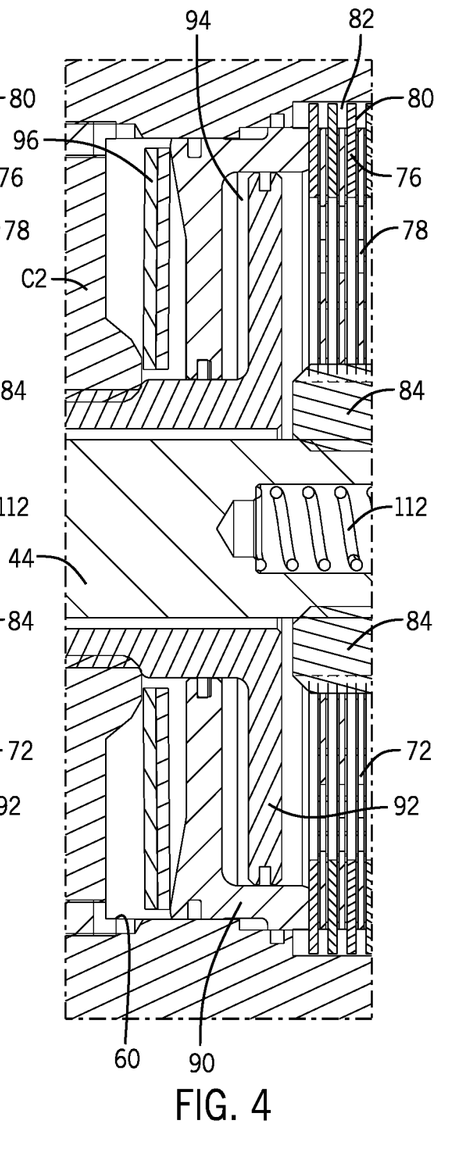
FIG. 4 is a view similar to FIG. 3 showing the example brake arrangement of the example end drive unit in an engaged state.
Figure 5:
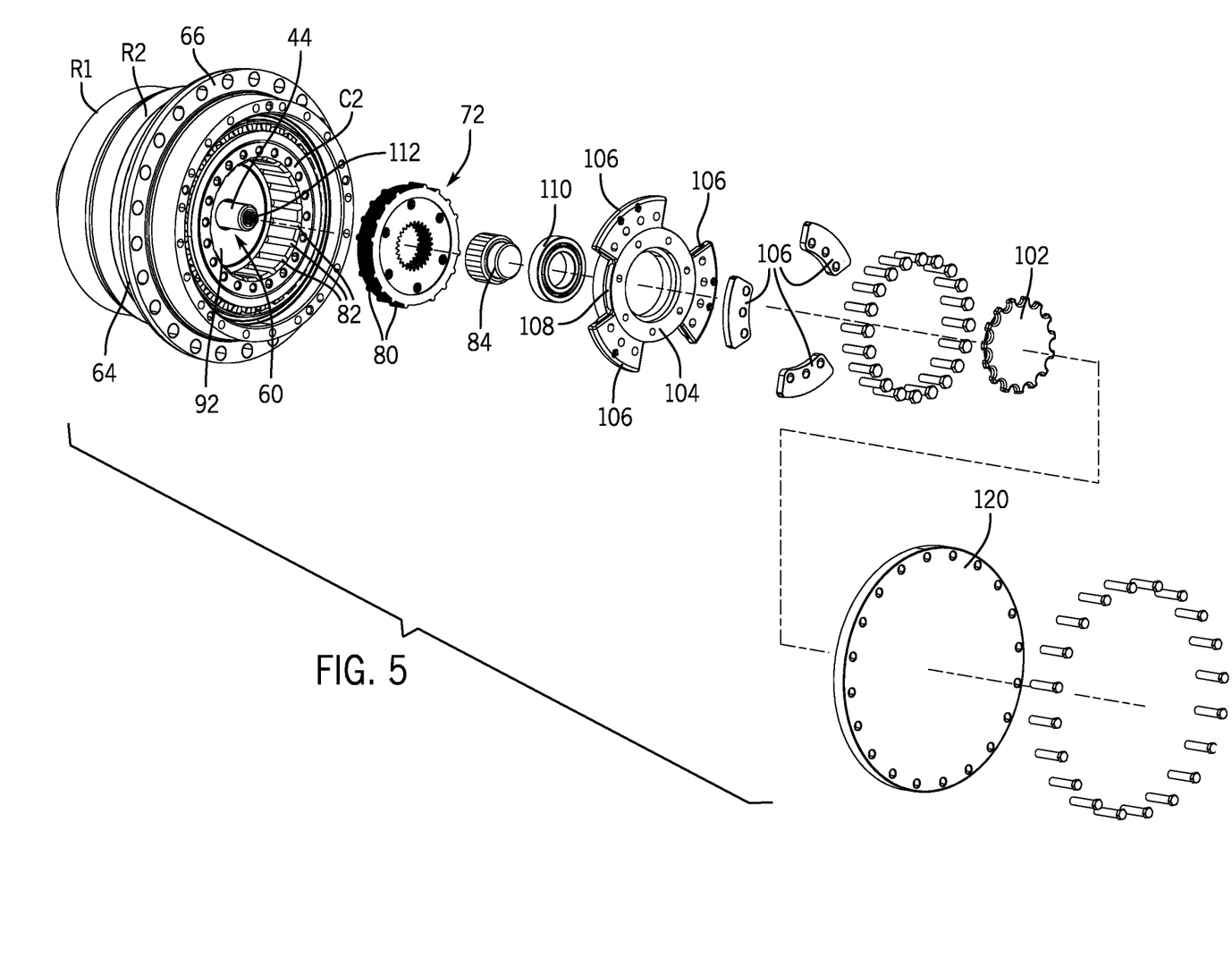
FIG. 5 is a partial assembly view of the example end drive unit of FIG. 2 shown with certain components (e.g., a service panel and a brake pack for the brake arrangement) disassembled.

Referring also to FIGS. 3-5, the brake cavity 60 of the carrier C2 is aligned concentric with the drive axis A and deep enough to contain a brake arrangement 70, which may be utilized as a service brake, a park brake, or both. The brake arrangement 70 has a brake pack 72 (or friction pack) and an actuator 74. The brake pack 72 is an arrangement of disc plates 76 and friction discs 78 alternately interleaved with one another. The number, thickness, and diameter of the disc plates 76 and the friction discs 78 can be set according to the braking force requirements of the work vehicle 10. In some cases, windage losses in the brake pack 72 can reduced by reducing the number of rotating components (e.g., the friction discs 78), thereby allowing for efficient high-speed brake operations. The disc plates 76 have a series of raised lobes 80 at their outer peripheries that are configured to fit within complementary shaped grooves formed at the inner surface of the annular section 58 of the carrier C2 and which are open ended at the outboard side of the carrier C2. The engagement of the lobes 80 and the grooves 82 creates an interference causing the disc plates 76 to remain fixed with the carrier C2. The friction discs 78, which are sandwiched between the disc plates 76, are splined to an adapter piece 84 (described further below) that is splined to the input shaft 44 to co-rotated therewith relative to the disc plates 76.

The brake actuator 74 includes an annular actuator piston 90 that translates along the drive axis A to engage or disengage the brake pack 72 and an annular member 92 that is disposed about the input shaft 44 but does not rotate with the input shaft 44. Instead, the annular member 92 is fixedly coupled (i.e., via a toothed or splined connection) to the carrier C2. The actuator piston 90 and the annular member cooperate and have cooperating seals (e.g., o-rings) to form therebetween a pressure chamber 94 in which hydraulic fluid may be introduced. The brake cavity 60 also contains a piston spring 96 (e.g., a Bellville spring) to act on the actuator piston 90. In the illustrated example, the brake actuator 74 is a spring-applied, hydraulically released (SAHR) arrangement in which, when acting as a service brake during normal operation of the work vehicle 10, the pressure chamber 94 is filled with hydraulic fluid to cause hydraulic pressure to force the actuator piston 90 to move away from, and thereby disengage, the brake pack 72, as shown in FIG. 3. When the brake arrangement 70 is to be applied (e.g., transiently as a service brake or for extended periods as a park brake), the pressure chamber 94 is relieved by allowing hydraulic fluid therein to return to tank, in which case the force of the piston spring 96 acts to move the actuator piston 90 toward, and thereby engage, the brake pack 72 as shown in FIG. 4. Engagement of the actuator piston 90 with the brake pack 72 causes frictional contact between the interleaved disc plates 76 and friction discs 78 to resist and impede relative rotation and rotation of the input shaft 44, which leads to locking of the first planetary set 50 due to the sun gear S1 and ring gear R1 both being held in a non-rotational condition. This in turn locks the second planetary set 52, in particular the ring 26 gear R2, and thereby the drive hub 64 and the hub 32 of the ground-engaging member 22.

The brake arrangement 70 is contained in the brake cavity 60 of the grounded carrier C2 by a retainer arrangement, which, in the illustrated example, includes a retainer plate 100 and a retainer cap 102. The retainer plate 100 is an annular component disposed concentrically about the drive axis A and has a ring section 104 at an inboard side that serves to backstop of the brake pack 72. Fasteners may be disposed axially through openings in the ring section 104 and corresponding openings in the brake pack 72 to further assemble the brake pack 72 to the grounded carrier C2. The retainer plate 100 also has arcuate flange sections 106 (e.g., six in number) that fit into a circumferential groove 108 around the ring section 104 and extend radially outwardly from the ring section 104. The flange sections 106 have openings for fasteners that thread into axially oriented threaded bores through an outboard face of the annular section 58 of the grounded carrier C2. Some or all of the flange sections could be formed integrally as a monolithic structure with the ring section 104. The ring section 104 of the retainer plate 100 mounts an outboard shaft bearing 110 that supports the outboard end of the input shaft 44 for rotation. The adapter piece 84 has a narrowed neck and an enlarged shoulder that engages the inner race of the outboard shaft bearing 110. The adapter piece 84 restrains a spring 112 that fits into an axial pocket 114 at the outboard end of the input shaft 44 and applies a pre-load force on the outboard shaft bearing 110. The retainer cap 102 fits into a central opening of the retainer plate 100 and secures thereto to enclose the brake arrangement 70. The brake arrangement 70 and all components internal to the end drive unit 30 are enclosed by a service panel 120 that is fixed to an outboard face of the drive hub 64 by threaded fasteners along its periphery disposed within axially oriented through bores in the wall of the drive hub 64 and axially-oriented threaded bores in the ring gear R2.

In the illustrated example, the inboard and outboard shaft bearings 42, 110 and the ring bearings 56 are ball bearings, and the pinion bearings are conical roller bearings. The dual main bearings 62 are conical roller bearings arranged in opposite angular orientations with respect to the plane at which the hub 32 of the ground-engaging members 22 mounts to the mounting flange 66 of the drive hub 64. However, it should be understood that other bearing configurations, quantities, and sizes could be utilized in the end drive unit 30.

Figure 6:
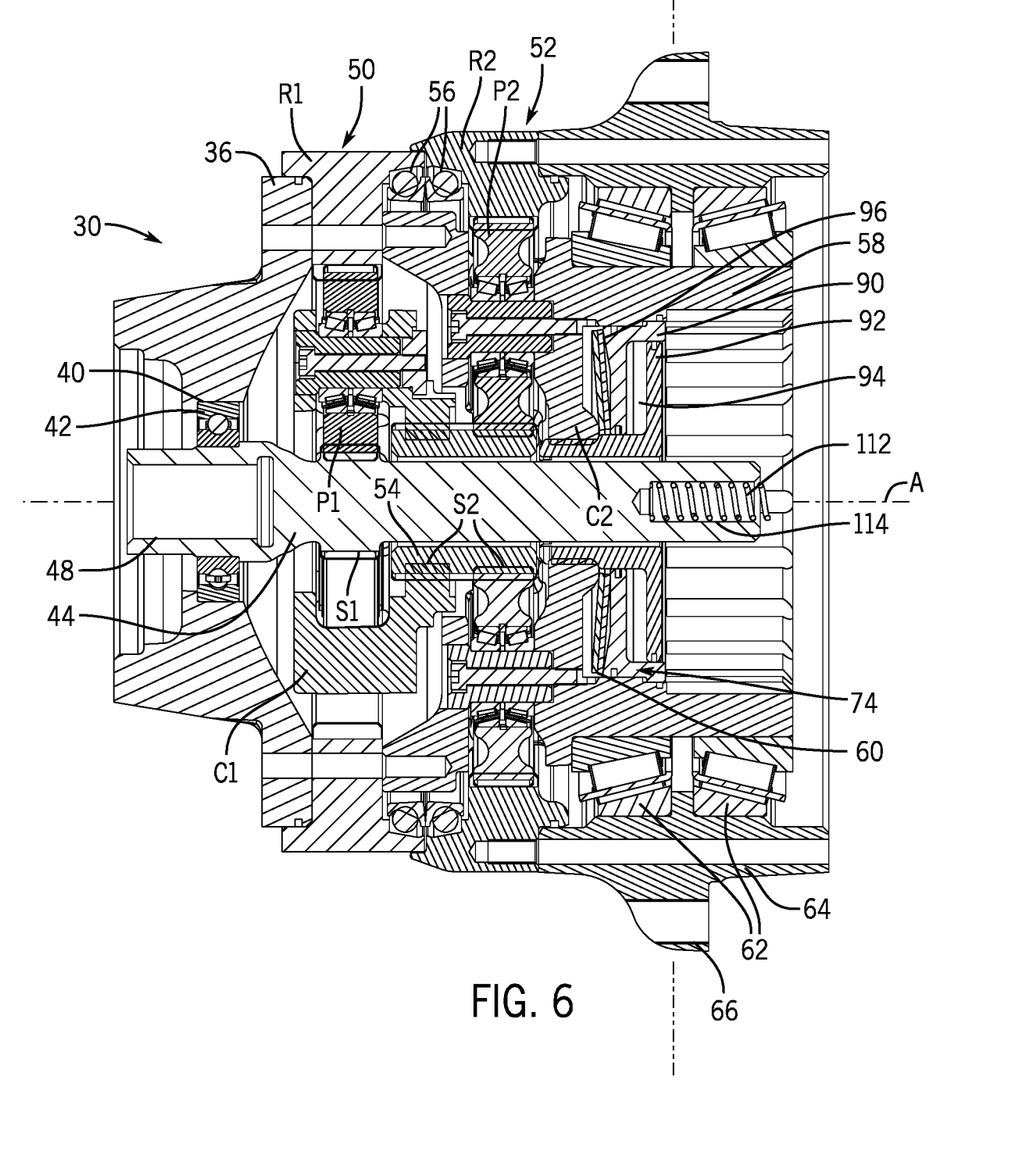
FIG. 6 is a sectional view similar to FIG. 2 thereof with the service panel and brake pack removed.

In addition to increasing the wheel/track base by shifting outward the plane at which the hub 32 of the ground-engaging members 22 mounts to the end drive unit 30, and thereby the work vehicle 10, the configuration of the end drive unit 30 facilitates servicing and replacement of the brake arrangement 70 without disassembling or otherwise disrupting the double planetary arrangement. The brake arrangement 70 is accessed by removing the fasteners securing the service panel 120 and removing the service panel 120 from the drive hub 64. This is followed by removing the fasteners securing the retainer plate 100 to the ground carrier C2 and removing the retainer plate 100 from the grounded carrier C2. This allows the brake pack 72 to be extracted from the end drive unit 30, as shown in FIG. 6, by sliding the disc plate lobes 80 outwardly until free of the grooves 82 in the grounded carrier C2 and sliding the adapter piece 84 from the outboard end of the input shaft 44. Any fasteners securing or otherwise coupling the retainer plate 100 and the brake pack 72 may then also be removed. This allows full access to repair or replace the brake pack 72. It also allows the brake actuator 74 components (e.g., piston 90, piston spring 96, o-rings) to be accessed, cleaned, and/or replaced. Moreover, installation of the main bearings 62 and the drive hub 64 is facilitated by the aforementioned component packaging of the end drive unit 30.

The adapter piece 84, the spring 112, and the outboard shaft bearing 110 at the outboard end of the input shaft 44 may also be removed and replaced without removing the brake arrangement 70. It should be noted that while the outboard shaft bearing 110 may have its outer race fixed to the retainer plate 100 (e.g., via a press-fit), in the illustrated example, the adapter piece 84, as pre-loaded by the spring 112, presses the outboard shaft bearing 110 against an annular inboard surface of the retainer cap 102. Removal of the outboard shaft bearing 110 may accessed, removed, and replaced with only the service panel 120 and the retainer cap 102 removed and while the retainer plate 100 remains fully fastened to the grounded carrier C2 and without removing the brake pack 72 or otherwise disrupting the brake arrangement 70. Depending on the construction of the brake pack 72, and the coupling of the brake pack 72 and the adapter piece 84 to the input shaft 44, it may further be possible to access, remove, and replace the adapter piece 84 and spring 112 with only the service panel 120 and the retainer cap 102 removed and while the retainer plate 100 remains fully fastened to the grounded carrier C2 and without removing the brake pack 72 itself. Allowing servicing of these components without disassembling some or all of the dual planetary arrangement significantly improves the ease and efficiency of service and installation operations.

Figure 7:
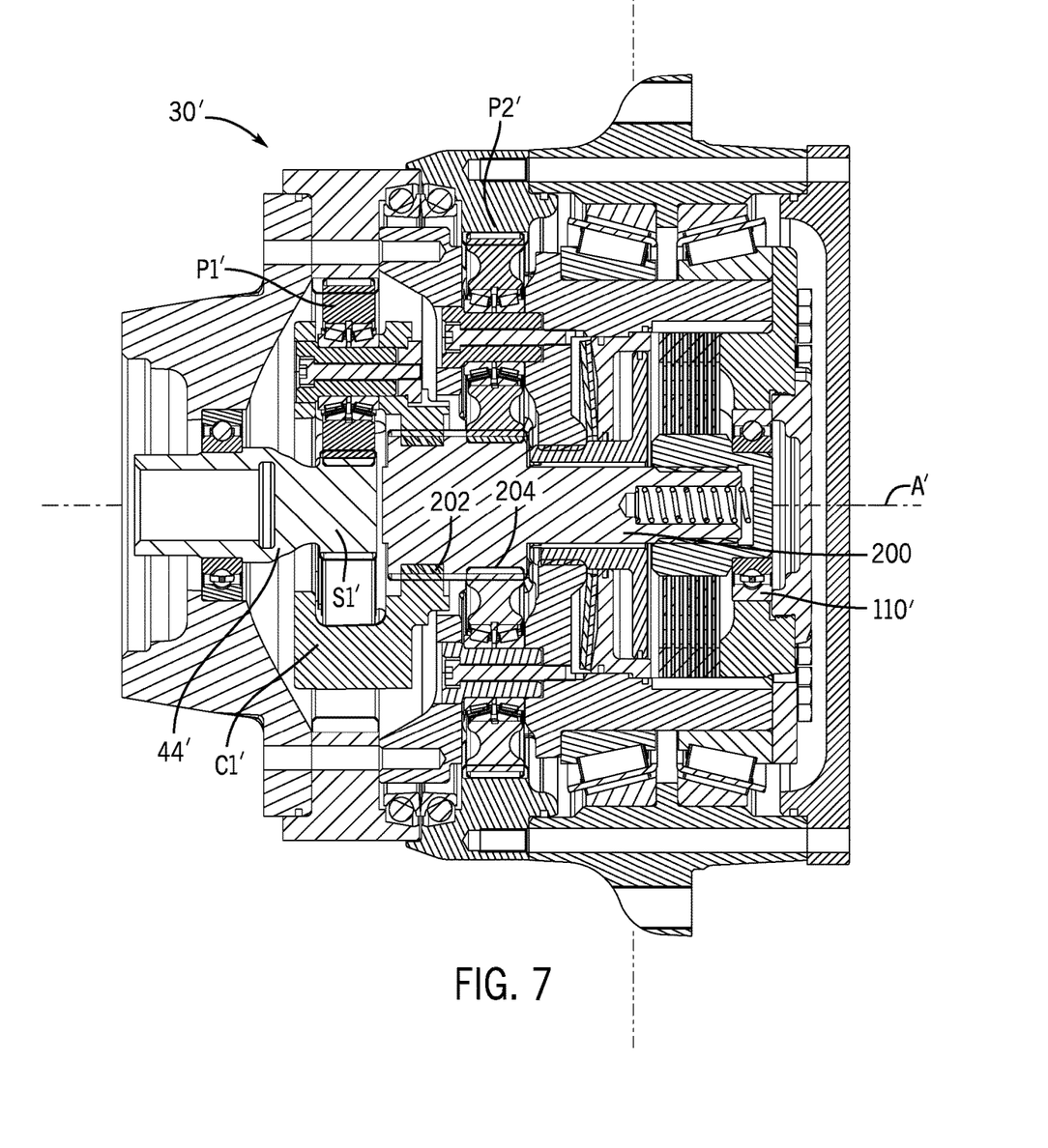
FIG. 7 is a sectional view of another example end drive unit according to the present disclosure.

Various alternative configurations of the end drive unit disclosed herein may be devised and utilized in a work vehicle. By way of example, FIG. 7 illustrates an end drive unit 30' that is identical to the end drive unit 30 described above except that the input shaft 44' is truncated after the engagement with the integrated sun gear S1' with the planet gears P1', and a separate, disconnected brake shaft 200 is arranged concentrically with the drive axis A'. The outboard end of the brake shaft 200 is mounted for rotation by the outboard shaft bearing 110', and the inboard end of the brake shaft 200 replaces the hollow shaft in the embodiment illustrated in FIG. 2 and instead forms the sun gear S2' with two integral toothed or splined sections 202 and 204 that couple the brake shaft 200 to the first stage carrier C1' and drive the second stage planet gears P2'.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An end drive unit for a work vehicle having a ground-engaging member, comprising:
    a drive casing configured to mount to the work vehicle;
    an input shaft disposed within the drive casing and configured to receive rotational power;
    a planetary set driven by the input shaft and having a ring gear and having a grounded carrier fixed with respect to the drive casing, wherein the grounded carrier has an elongated annular section;
    a drive hub mountable to the ground-engaging member of the work vehicle and supported for rotation about a drive axis by the ring gear of the planetary set and a bearing mounted to the elongated annular section of the grounded carrier;
    a drive brake arrangement configured to impede rotation of the planetary set and thereby rotation of the drive hub about the drive axis; and
    a service panel coupled to the drive casing such that removal of the service panel facilitates access to the drive brake arrangement for service or deactivation of the drive brake arrangement without disassembly of the planetary set;
    wherein the planetary set is configured such that the elongated annular section of the grounded carrier extends along the drive axis away from the ring gear and wherein the bearing is mounted to the elongated annular section of the grounded carrier axially between the ring gear and the service panel.

2. The end drive unit of claim 1, wherein the planetary set is a dual planetary set with a first stage planetary set and a second stage planetary set in which power is transmitted in to a first sun gear and out through a first carrier of the first stage planetary set and in to a second sun gear and out through a second ring gear of the second stage planetary set; and
    wherein the first sun gear is driven by the input shaft and the second ring gear is the ring gear that drives the drive hub.

3. The end drive unit of claim 2, wherein the grounded carrier is a second carrier of the second stage planetary set; and
    wherein the bearing is a dual bearing arrangement mounted to the elongated annular section of the second carrier outboard of the second ring gear of the second stage planetary set.

4. The end drive unit of claim 3, wherein the second carrier and a first ring gear of the first stage planetary set are bolted to the drive casing.

5. The end drive unit of claim 3, wherein the input shaft defines or supports for corotation the first sun gear of the first stage planetary set and supports the second sun gear of the second stage planetary set for relative rotation therewith.

6. The end drive unit of claim 5, wherein the input shaft supports the drive brake arrangement at an outboard end opposite from an input at an inboard end, the input shaft supporting the drive brake arrangement outboard of the first stage planetary set.

7. The end drive unit of claim 6, wherein the drive brake arrangement is disposed about the drive axis concentric with the elongated annular section of the second carrier and the dual bearing arrangement.

8. The end drive unit of claim 7, wherein the drive brake arrangement includes an actuator and a disc pack; and
    wherein the actuator is selectively operated to engage and release the disc pack, and when engaged, the drive brake arrangement ties the input shaft to the second carrier which is grounded to the drive casing.

9. The end drive unit of claim 8, wherein the disc pack is coupled to the input shaft by an adapter and retained within the second carrier by a retainer plate; and
    wherein, when the service panel is removed, the retainer plate is accessible and when the retainer plate is removed, the drive brake arrangement is serviceable.

10. The end drive unit of claim 1, wherein the service panel is mounted directly to an outboard face of the drive hub.

11. A work vehicle comprising:
    a chassis;
    a ground-engaging member supporting the chassis off the ground, the ground-engaging member facilitating tractive motion of the work vehicle by rotation about a drive axis;
    a power drive unit; and an end drive unit driven by the power drive unit and including:
- a drive casing configured to couple to the chassis;
- an input shaft disposed within the drive casing and receiving rotational power from the power drive unit;
- a planetary set driven by the input shaft and having a ring gear and having a grounded carrier fixed with respect to the drive casing, wherein the grounded carrier has an elongated annular section;
- a drive hub mounted to the ground-engaging member and supported for rotation about the drive axis by the ring gear of the planetary set and a bearing mounted to the elongated annular section of the grounded carrier;
- a drive brake arrangement configured to impede rotation of the planetary set and thereby rotation of the drive hub about the drive axis; and
- a service panel coupled to the drive casing such that removal of the service panel facilitates access to the drive brake arrangement for service or deactivation of the drive brake arrangement without disassembly of the planetary set;
- wherein the planetary set is configured such that the elongated annular section of the grounded carrier extends along the drive axis away from the ring gear and wherein the bearing is mounted to the elongated annular section of the grounded carrier axially between the ring gear and the service panel.

12. The work vehicle of claim 11, wherein the planetary set is a dual planetary set with a first stage planetary set and a second stage planetary set in which power is transmitted in to a first sun gear and out through a first carrier of the first stage planetary set and in to a second sun gear and out through a second ring gear of the second stage planetary set; and
wherein the first sun gear is driven by the input shaft and the second ring gear is the ring gear that drives the drive hub.

13. The work vehicle of claim 12, wherein the grounded carrier is a second carrier of the second stage planetary set; and
wherein the bearing is a dual bearing arrangement mounted to the elongated annular section of the second carrier outboard of the second ring gear of the second stage planetary set.

14. The work vehicle of claim 13, wherein the second carrier and a first ring gear of the first stage planetary set are bolted to the drive casing.

15. The work vehicle of claim 13, wherein the input shaft defines or supports for corotation the first sun gear of the first stage planetary set and supports the second sun gear of the second stage planetary set for relative rotation therewith.

16. The work vehicle of claim 15, wherein the input shaft supports the drive brake arrangement at an outboard end opposite from an input at an inboard end, the input shaft supporting the drive brake arrangement outboard of the first stage planetary set.

17. The work vehicle of claim 16, wherein the drive brake arrangement is disposed about the drive axis concentric with the elongated annular section of the second carrier and the dual bearing arrangement.

18. The work vehicle of claim 17, wherein the drive brake arrangement includes an actuator and a disc pack; and
wherein the actuator is selectively operated to engage and release the disc pack, and when engaged, the drive brake arrangement ties the input shaft to the second carrier which is grounded to the drive casing.

19. The work vehicle of claim 18, wherein the disc pack is coupled to the input shaft and retained within the second carrier by a retainer plate; and
wherein, when the service panel is removed, the retainer plate is accessible and when the retainer plate is removed, the drive brake arrangement is serviceable.

20. The work vehicle of claim 11, wherein the service panel is mounted directly to an outboard face of the drive hub.

* * * * *